United States Patent
Pineda

(10) Patent No.: US 11,628,396 B2
(45) Date of Patent: Apr. 18, 2023

(54) CARBON DIOXIDE REDUCTION FILTER

(71) Applicant: Leo N Pineda, El Paso, TX (US)

(72) Inventor: Leo N Pineda, El Paso, TX (US)

(*) Notice: Subject to any disclaimer, the term of this patent is extended or adjusted under 35 U.S.C. 154(b) by 107 days.

(21) Appl. No.: 16/679,196

(22) Filed: Nov. 9, 2019

(65) Prior Publication Data

US 2021/0138395 A1 May 13, 2021

(51) Int. Cl.
*B01D 53/22* (2006.01)
*B01D 46/00* (2022.01)
*B01D 39/18* (2006.01)
*F01N 3/021* (2006.01)
*B01D 71/02* (2006.01)

(52) U.S. Cl.
CPC .......... *B01D 53/229* (2013.01); *B01D 39/18* (2013.01); *B01D 46/0005* (2013.01); *B01D 53/225* (2013.01); *B01D 71/021* (2013.01); *F01N 3/021* (2013.01); *B01D 2053/221* (2013.01); *B01D 2279/30* (2013.01)

(58) Field of Classification Search
None
See application file for complete search history.

(56) References Cited

U.S. PATENT DOCUMENTS

| | | | | |
|---|---|---|---|---|
| 3,981,698 A * | 9/1976 | Leppard | ................. | B01D 53/04 95/119 |
| 5,853,445 A * | 12/1998 | Wong | ................. | B01D 46/0023 55/343 |
| 6,474,312 B1 * | 11/2002 | Zulauf | ................. | B01D 53/02 123/518 |
| 6,736,871 B1 * | 5/2004 | Green | ................. | B01D 53/0415 55/385.3 |
| 6,773,491 B1 | 8/2004 | Bohl | | |
| 6,945,036 B2 | 9/2005 | Kato et al. | | |
| 7,146,969 B2 | 12/2006 | Weirich | | |
| 8,381,518 B2 | 2/2013 | Miller | | |
| 8,440,005 B2 | 5/2013 | Lang et al. | | |
| 10,267,197 B2 | 4/2019 | Nilsson | | |
| 2002/0074174 A1 * | 6/2002 | Dettling | ............. | B01D 53/0415 180/68.1 |
| 2006/0272508 A1 * | 12/2006 | Hoke | .................. | B01D 53/0415 96/134 |
| 2011/0318231 A1 * | 12/2011 | Hago | ..................... | B01D 53/62 422/105 |
| 2013/0312612 A1 * | 11/2013 | Sugimoto | .......... | B01D 53/0407 96/131 |
| 2014/0208950 A1 * | 7/2014 | Giurgiutiu | ......... | B01D 53/0415 96/153 |
| 2019/0209961 A1 * | 7/2019 | Kennedy | ............ | B01D 53/0415 |

* cited by examiner

Primary Examiner — Jason M Greene

(57) ABSTRACT

An illustrated view of an exemplary air filter for reducing emissions is presented. The air filter is useful for removing toxic gases from the air surrounding a combustion engine of a vehicle is presented. The air filter is useful for scrubbing the ambient air for removal of toxic contaminants such as carbon dioxide and thus reducing harmful emissions of a vehicle. The air filter though described for a vehicle can also be used in industry settings as well as at home. The air filter is recyclable. Although a vehicle is shown, it is an example only. Other applications are possible and have been contemplated for the air filter 100 including, but not limited to, commercial applications, home applications, industrial applications, etc.

14 Claims, 3 Drawing Sheets

CARBON DIOXIDE REDUCTION FILTER

FIELD OF THE INVENTION

This invention relates to engine air intake systems. More particularly, it relates to reducing carbon emissions of a motor and ambient carbon as it enters the engine's air intake system.

BACKGROUND

Carbon dioxide removal (CDR) refers to a group of technologies the objective of which is the large-scale removal of carbon dioxide from the atmosphere. Among such technologies are bio-energy with carbon capture and storage, biochar, ocean fertilization, enhanced weathering, and direct air capture when combined with storage. CDR is a different approach from removing CO2 from the stack emissions of large fossil fuel point sources, such as power stations. The latter reduces emission to the atmosphere but cannot reduce the amount of carbon dioxide already in the atmosphere. As CDR removes carbon dioxide from the atmosphere, it 'creates' negative emissions that offset the emissions from small and dispersed point sources such as domestic heating systems, airplanes and vehicle exhausts. It is regarded by some as a form of climate engineering, while other commentators describe it as a form of carbon capture and storage or extreme mitigation. Whether CDR would satisfy common definitions of "climate engineering" or "geoengineering" usually depends upon the scale at which it would be undertaken.

A particulate air filter is a device composed of fibrous or porous materials which removes solid particulates such as dust, pollen, mold, and bacteria from the air. Filters containing an adsorbent or catalyst such as charcoal (carbon) may also remove odors and gaseous pollutants such as volatile organic compounds or ozone. Air filters are used in applications where air quality is important, notably in building ventilation systems and in engines.

Some buildings, as well as aircraft and other human-made environments (e.g., satellites and space shuttles) use foam, pleated paper, or spun fiberglass filter elements. Another method, air ionizers, use fibers or elements with a static electric charge, which attract dust particles. The air intakes of internal combustion engines and air compressors tend to use either paper, foam, or cotton filters. Oil bath filters have fallen out of favor. The technology of air intake filters of gas turbines has improved significantly in recent years, due to improvements in the aerodynamics and fluid dynamics of the air-compressor part of the gas turbines.

The cabin air filter is typically a pleated-paper filter that is placed in the outside-air intake for the vehicle's passenger compartment. Some of these filters are rectangular and similar in shape to the combustion air filter. Others are uniquely shaped to fit the available space of particular vehicles' outside-air intakes.

Being a relatively recent addition to automobile equipment, this filter is often overlooked. Clogged or dirty cabin air filters can significantly reduce airflow from the cabin vents, as well as introduce allergens into the cabin air stream, and since the cabin air temperature depends upon the flow rate of the air passing through the heater core, the evaporator or both, they can greatly reduce the effectiveness of the vehicle's air conditioning and the heating performance. The poor performance of these filters is obscured by manufacturers by not using the minimum efficiency reporting value (MERV) rating system. Some people mistakenly believe that some of these are HEPA filters.

The combustion air filter prevents abrasive particulate matter from entering the engine's cylinders, where it would cause mechanical wear and oil contamination.

Most fuel injected vehicles use a pleated paper filter element in the form of a flat panel. This filter is usually placed inside a plastic box connected to the throttle body with duct work. Older vehicles that use carburetors or throttle body fuel injection typically use a cylindrical air filter, usually between 100 millimeters (4 in) and 400 millimeters (16 in) in diameter. This is positioned above or beside the carburetor or throttle body, usually in a metal or plastic container which may incorporate ducting to provide cool and/or warm inlet air, and secured with a metal or plastic lid. The overall unit (filter and housing together) called the air cleaner.

Gases such as carbon dioxide (CO2) are common in air surrounding combustion engines but air filters on vehicles are not configured to remove these gases from passing through the air system. CO2 is a toxic gas that cause injuries and potentially death as well as increase the carbon dioxide in the emissions of a vehicle which can cause damage to the ozone layer of the earth.

In light of the foregoing, there is a need for an air filter to be able to remove harmful gases such as CO2 from the air when filtered so that emissions are reduced from CO2 and the environment supports a healthier earth.

DETAILED DESCRIPTION

Figure 1:
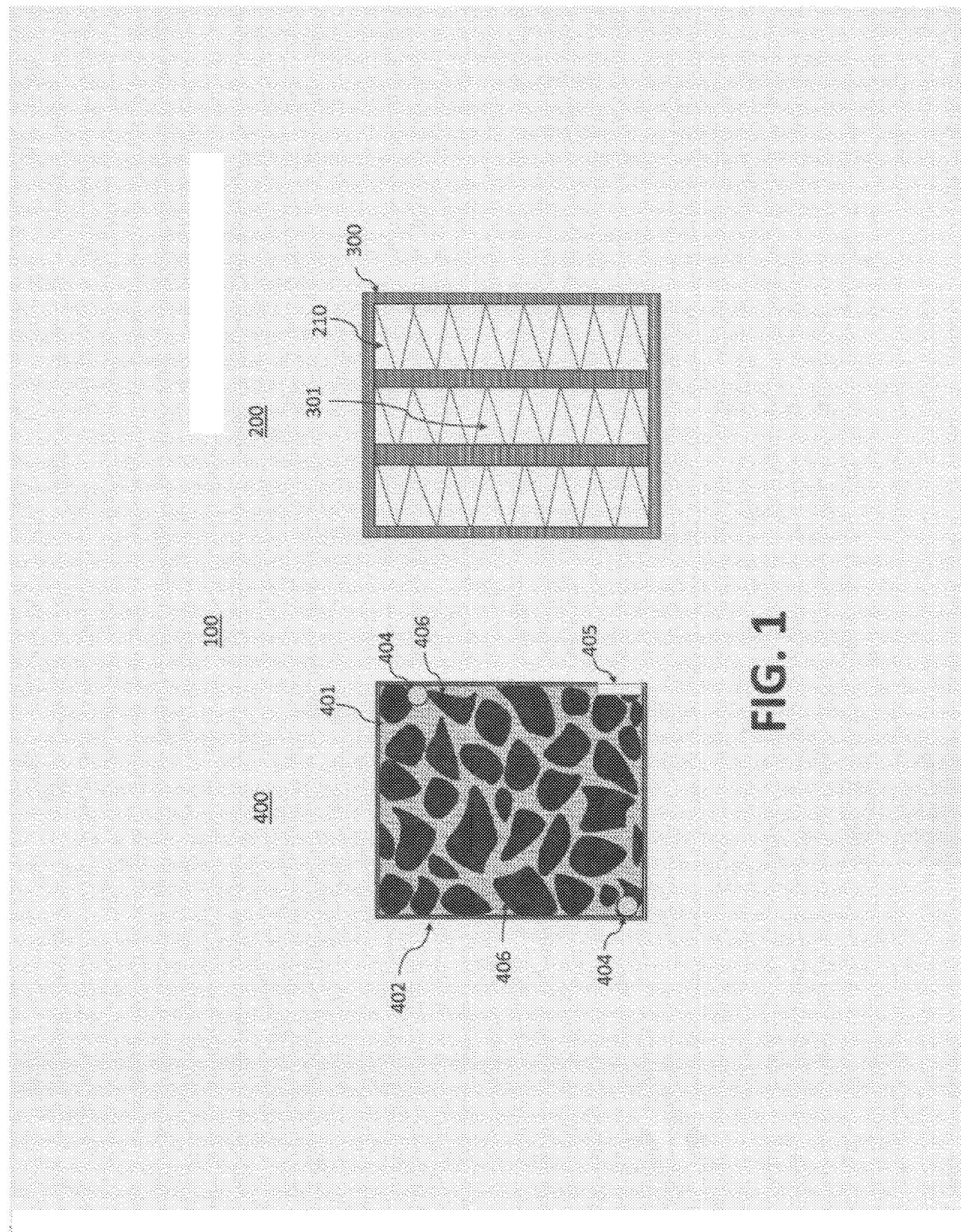
FIG. 1 is an illustrated view of an exemplary air filter.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Referring to FIG. 1, an illustrated view of an exemplary air filter 100 for reducing emissions is presented. The air filter 100 is useful for removing toxic gases from the air surrounding a combustion engine of a vehicle is presented. The air filter 100 is useful for scrubbing the ambient air for removal of toxic contaminants such as carbon dioxide and thus reducing harmful emissions of a vehicle. The air filter 100 though described for a vehicle can also be used in industry settings as well as at home. The air filter 100 is recyclable. Although a vehicle is shown, it is an example only. Other applications are possible and have been contemplated for the air filter 100 including, but not limited to, commercial applications, home applications, industrial applications, etc.

The air filter 100 has a regular air filter 200 and a carbon capture filter 400. The regular air filter 200 is preferably the size of an air intake system opening, however other sizes are hereby contemplated, including, but not limited to, slightly smaller than the air intake system opening, slightly larger than the air intake system opening, etc.

The regular air filter 200 has a frame 300 and a filter 210. The filter 210 is preferably made of a paper material, however other materials are hereby contemplated, including, but not limited to, cotton, microfiber, etc. The filter 210 is coupled in a middle portion 301 of the frame 300. The frame 300 is made of a plastic material, however other types of materials are hereby contemplated, including, but not limited to, paper, cardboard, poly-vinyl chloride (PVC), etc.

The carbon capture filter 400 has a filter 401 and a frame 402. The frame 402 is made of a plastic material, however other types of materials are hereby contemplated, including, but not limited to, paper, cardboard, poly-vinyl chloride (PVC), etc. The filter 401 of carbon capture filter 400 is preferably made of a charcoal material, however other materials are hereby contemplated, including, but not limited to, large membrane fibers, etc. The filter 401 of the carbon capture filter 400 is configured to be coupled in a middle portion 403 of the frame 402 of the carbon capture filter 400.

The carbon capture filter 400 further has one or more sensors 404. The sensors 404 are configured to detect the remaining life of the carbon capture filter 400. The sensors 404 is coupled to one or more indicators 405. The sensors 404 is further coupled to the filter 401 of the carbon capture filter 400. The indicators 405 are further securely coupled to the frame 402 of the carbon capture filter 400 where the indicator is configured to be visible.

The carbon capture filter 400 has a plurality of membranes 406. The membranes 406 are preferably made of activated carbon. The membranes 406 may be of different sizes and shapes.

In a preferred embodiment, the frame 402 of the carbon capture filter 400 is securely coupled to the frame 300 of the regular air filter 200. In a second embodiment, the frame 402 of the carbon capture filter 400 is configured to be removably coupled to the frame 300 of the regular air filter 200.

Figure 2:
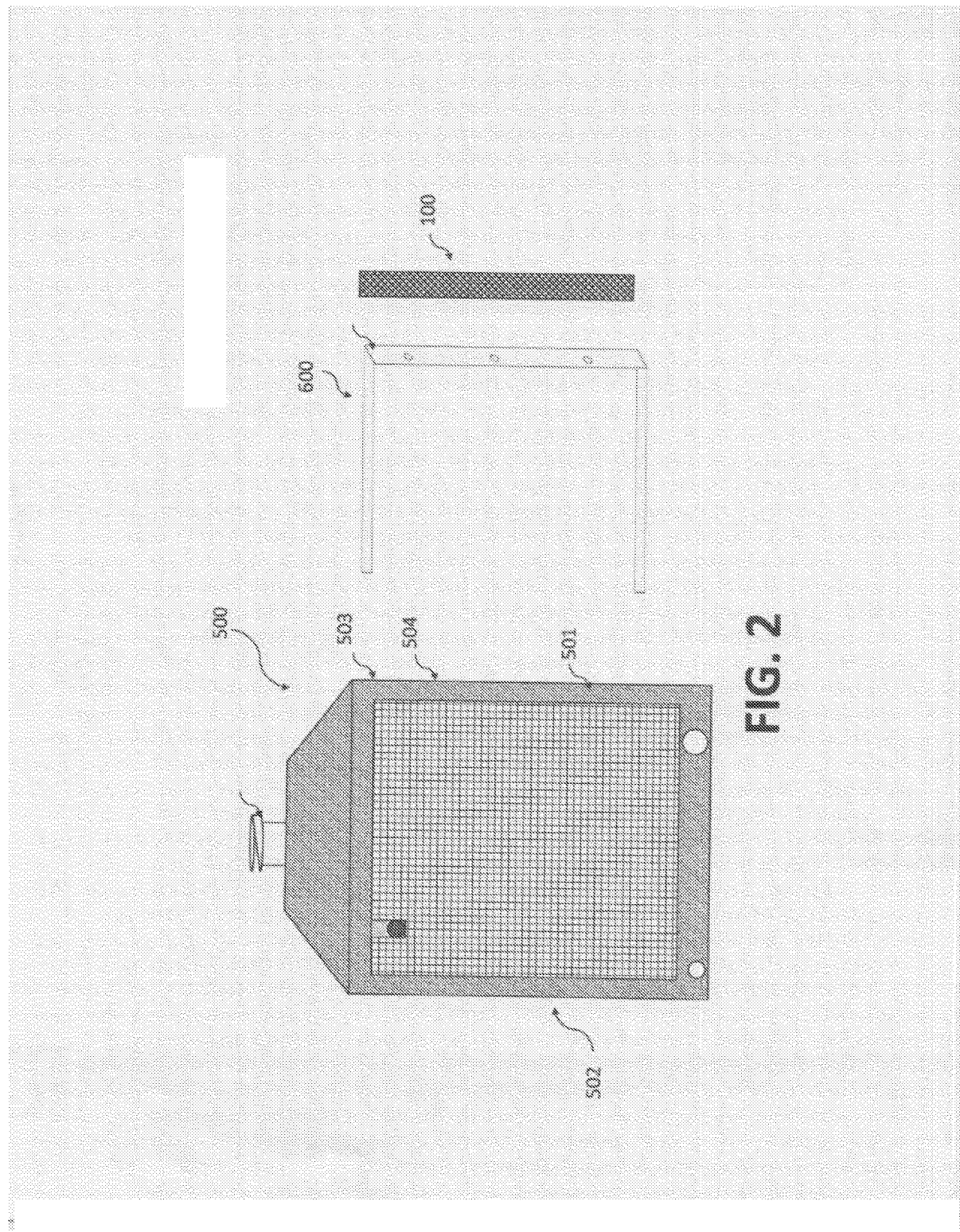
FIG. 2 is an illustrated view of the exemplary air filter shown in FIG. 1 use with a radiator.

Moving to FIG. 2, an illustrated view of a radiator 500 coupled with the exemplary air filter 100 shown in FIG. 1.

The radiator 500 is commonly found in automobiles, however other applications as described earlier are possible for use of the exemplary air filter shown in FIG. 1. The radiator 500 has a front 501, a back 502, an inside 503 and a filter opening 504.

The carbon capture filter 400 of the air filter 100 is coupled to the regular air filter 200. The air filter 100 is coupled to a filter opening frame 600. Preferably, the air filter 100 coupled to the filter opening frame 600 is inserted into the inside 503 of the radiator 500 through the filter opening 504. However, the radiator 500 may not accommodate the air filter 100, thus the air filtered 100 may also be coupled to the back 502 of the radiator 500 or the front 501 of the radiator 500.

Figure 3:
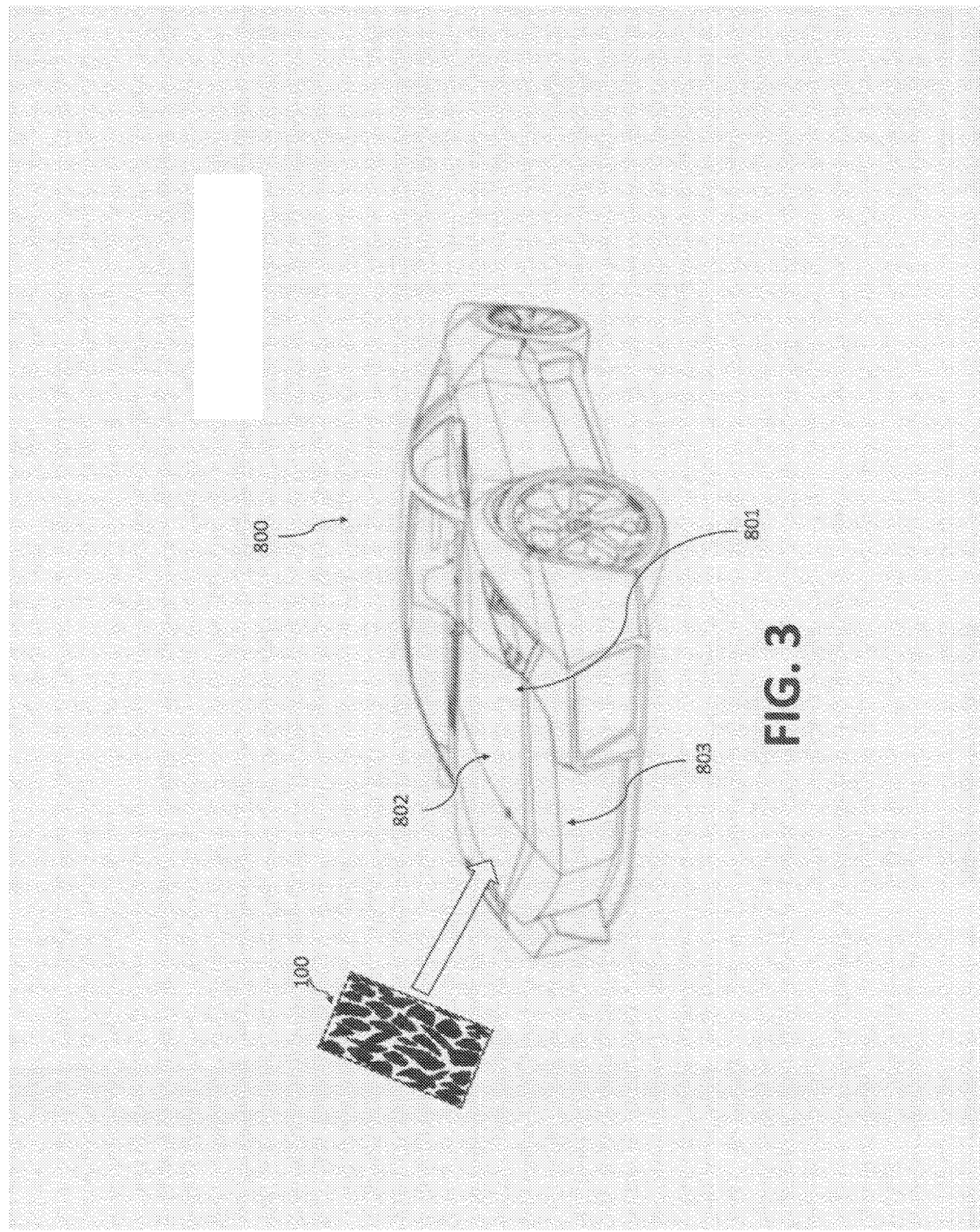
FIG. 3 is an illustrated view of the exemplary air filter shown in FIG. 1 use with a vehicle.

Moving now to FIG. 3, an illustrated view of the exemplary air filter 100 shown in FIG. 1 is presented with a vehicle 800.

The vehicle 800 has a hood 801, an engine compartment 802 and a front air intake slot 803. The hood 801 of the vehicle 800 is open to allow access to the engine compartment 802. The air filter 100 is inserted into the radiator 500 (shown in FIG. 2) unless the radiator 500 not accept the air filter 100. When this occurs, the air filter is coupled to the front 501 of the radiator 500 or the back 502 of the radiator 500 as shown in FIG. 2.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A carbon capture filter device for removing carbon dioxide to reduce emissions from a vehicle, the device consisting of:

an air filter, the air filter having a frame and a filter;

a carbon capture filter, the carbon capture filter consisting of:

a filter, the filter comprising:

a plurality of membranes, wherein the plurality of membranes are made of an activated carbon material;

a frame, the filter coupled to substantially a middle portion of the frame;

a radiator;

one or more sensors, the sensors being for sensing the remaining life of the filter, wherein the sensors being coupled to the filter; and one or more indicators, the indicators being coupled to the sensor, wherein the indicators being for indicating the sensed remaining life of the filter; and the frame of the carbon capture filter being coupled to the frame of the air filter.

2. The device of claim 1, wherein the air filter being the same size as an air intake system opening.

3. The device of claim 1, wherein the carbon capture filter being the same size as an air intake system opening.

4. The device of claim 1, wherein the filter of the carbon capture filter being made of a charcoal material.

5. The device of claim 1, wherein the frame of the carbon capture filter being made of a plastic material.

6. The device of claim 1, wherein the filter of the regular air filter being made of a paper material.

7. The device of claim 1, wherein the frame of the regular air filter being made of a plastic material.

8. The device of claim 1, wherein the carbon capture filter being recyclable.

9. The device of claim 1, wherein the membranes being of different sizes.

10. The device of claim 1, wherein the membranes being of different shapes.

11. The device of claim 1, wherein the carbon capture filter being inserted into an inside of a radiator.

12. The device of claim 1, wherein the carbon capture filter being coupled to a front of a radiator.

13. The device of claim 1, wherein the carbon capture filter being coupled to a back of a radiator.

14. A carbon capture filter device for removing carbon dioxide to reduce emissions from a vehicle, the device consisting of:

an air filter, the air filter having a frame and a filter, wherein the air filter being the same size as an air intake system opening;

a carbon capture filter, the carbon capture filter consisting of:

a filter, the filter comprising:

a plurality of membranes, wherein the plurality of membranes are made of an activated carbon material;

a frame, the filter coupled to substantially a middle portion of the frame;

one or more sensors, the sensors being for sensing the remaining life of the filter, wherein the sensors being coupled to the filter; and one or more indicators, the indicators being coupled to the sensor, wherein the indicators being for indicating the sensed remaining life of the filter, wherein the membranes have different shapes, wherein the membranes having different sizes; and the frame of the carbon capture filter being coupled to the frame of the air filter, wherein the carbon capture filter being coupled to one of: an inside of a radiator, to a back of the radiator and to a front of the radiator, wherein the carbon capture filter being recyclable, wherein the carbon capture filter being made of a charcoal material, wherein the carbon capture filter being the same size as an air intake system opening.

\* \* \* \* \*